United States Patent
Magnuson et al.

[11] Patent Number: 5,839,787
[45] Date of Patent: *Nov. 24, 1998

[54] SEAT ASSEMBLY FOR MASS TRANSIT VEHICLE

[75] Inventors: Richard C. Magnuson, Kentwood; Michael E. Phillips, Jenison, both of Mich.

[73] Assignee: American Seating Company, Grand Rapids, Mich.

[ * ] Notice: The term of this patent shall not extend beyond the expiration date of Pat. No. 5,655,816.

[21] Appl. No.: 896,738

[22] Filed: Jul. 21, 1997

Related U.S. Application Data

[62] Division of Ser. No. 726,919, Oct. 7, 1996, Pat. No. 5,655,816, which is a continuation of Ser. No. 312,825, Sep. 24, 1994, abandoned.

[51] Int. Cl.⁶ .................................................. A47C 5/10
[52] U.S. Cl. .................. 297/452.2; 297/440.22; 297/232; 297/452.19; 411/85
[58] Field of Search ................ 297/452.2, 452.19, 297/440.22, 232, 452.18; 411/85, 84, 258, 301, 302; 403/407.1, 405.1, 348

[56] References Cited

U.S. PATENT DOCUMENTS

| | | |
|---|---|---|
| 2,903,044 | 9/1959 | Peras . |
| 3,861,747 | 1/1975 | Diamond . |
| 3,884,524 | 5/1975 | Eberle . |
| 3,885,766 | 5/1975 | Resch . |
| 3,887,230 | 6/1975 | Grohing . |
| 4,040,228 | 8/1977 | Skubic ............................. 411/302 X |
| 4,060,279 | 11/1977 | Vogel . |
| 4,277,101 | 7/1981 | Vogel . |
| 4,426,114 | 1/1984 | Kehl . |
| 4,575,295 | 3/1986 | Rebentisch ............................. 411/85 |
| 4,580,840 | 4/1986 | Cunningham . |
| 4,638,546 | 1/1987 | Benshoff . |
| 4,702,939 | 10/1987 | Myauchi et al. .................. 411/256 X |
| 4,732,359 | 3/1988 | Danton . |
| 4,761,036 | 8/1988 | Vogel . |
| 4,784,552 | 11/1988 | Rebentisch ............................. 411/85 |
| 4,830,531 | 5/1989 | Condit et al. ..................... 411/85 X |
| 4,890,884 | 1/1990 | Olson . |
| 4,913,489 | 4/1990 | Martin . |

(List continued on next page.)

FOREIGN PATENT DOCUMENTS

| | | |
|---|---|---|
| 987221 | 4/1976 | Canada . |
| 0042565 | 6/1981 | European Pat. Off. . |
| 2204076 | 1/1972 | Germany . |
| 1408430 | 9/1971 | United Kingdom . |

*Primary Examiner*—Peter M. Cuomo
*Assistant Examiner*—David E. Allred
*Attorney, Agent, or Firm*—Young & Basile, P.C.

[57] ABSTRACT

An improved seat assembly for mass transit vehicles and an improved methodology for providing seating in mass transit vehicles. The seat assembly includes a universal seat frame which is formed of aluminum extrusions welded together and which is usable in combination with a variety of support bracketry so that a single common seat frame may be utilized to provide a variety of seating positions and seating attitudes within the vehicle. The seat frame includes side rails and cross rails extending between the side rails. Each cross rail includes an upper tube portion and a lower track portion formed integrally with the bottom wall of the upper tube portion and defining a groove. A slot in the bottom wall of the track portion communicates with the groove. Fastener assemblies mounted on the associated bracket hardware include a nut slidably positioned within the respective groove and a bolt extending upwardly from a mounting portion of the bracket and through the slot in the lower wall of the track portion of the rail for threaded access to the nut. The bracketry may comprise a pedestal positioned beneath the seat frame and supported on the underlying floor surface; a cantilever beam structure secured at one end to a side wall of the vehicle and secured at its free end to the cross rails of the seat frame; or sundry other bracketry to allow the seat frame to be mounted within the vehicle in overlying relation to wheel housings or the like.

4 Claims, 6 Drawing Sheets

U.S. PATENT DOCUMENTS

| | | | |
|---|---|---|---|
| 4,917,553 | 4/1990 | Muller | 411/85 |
| 4,927,201 | 5/1990 | Froutzis . | |
| 4,950,099 | 8/1990 | Roellin | 403/348 |
| 5,056,848 | 10/1991 | Fekete . | |
| 5,082,320 | 1/1992 | Danton . | |
| 5,098,156 | 3/1992 | Vogel . | |
| 5,246,270 | 9/1993 | Vogel . | |
| 5,251,959 | 10/1993 | De Braal . | |
| 5,271,586 | 12/1993 | Schmidt | 411/85 X |
| 5,375,798 | 12/1994 | Hungerford, Jr. | 411/85 X |
| 5,382,083 | 1/1995 | Fecteau . | |
| 5,411,356 | 5/1995 | Travis et al | 411/85 |
| 5,412,860 | 5/1995 | Miyauchi . | |

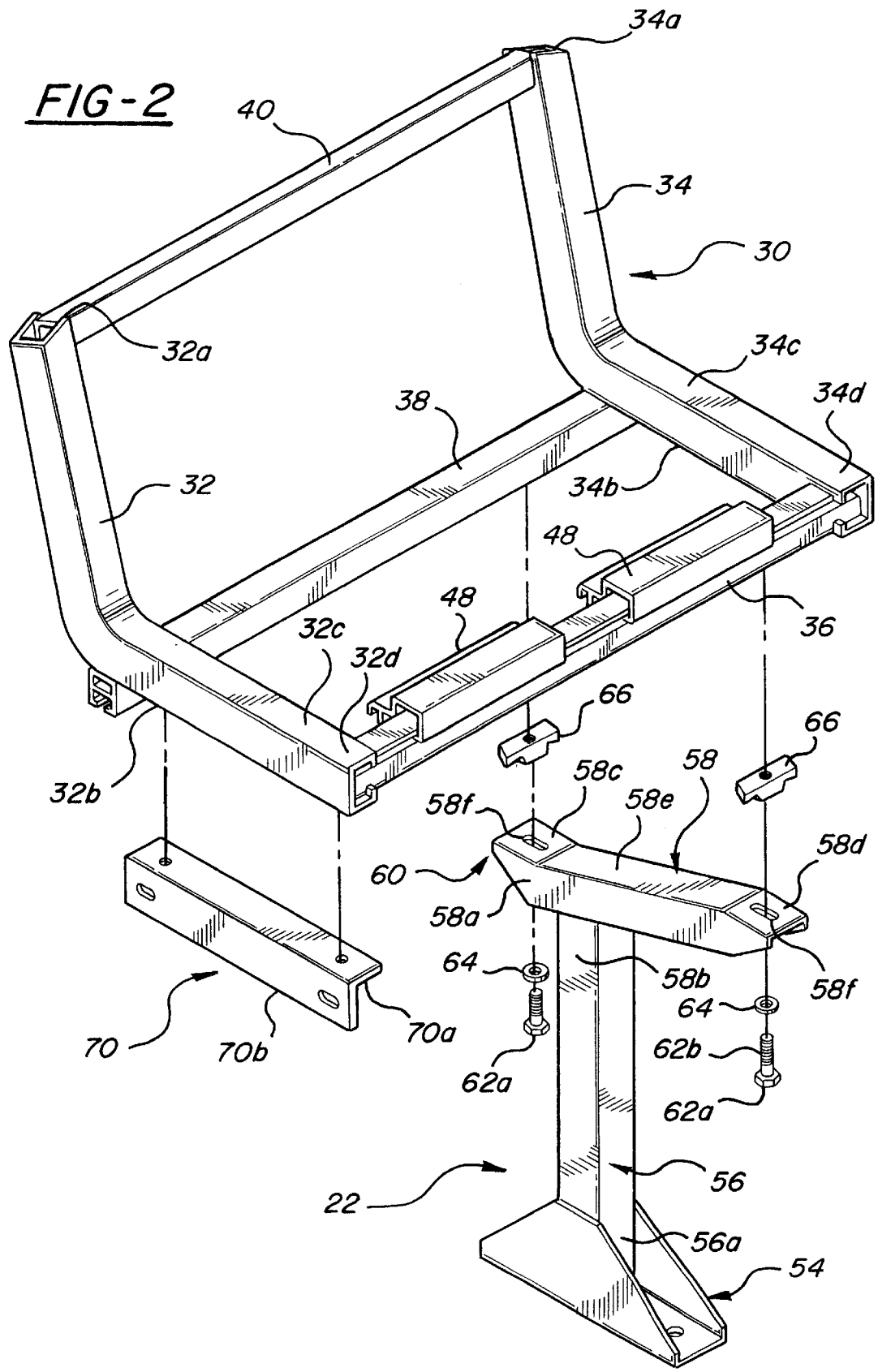

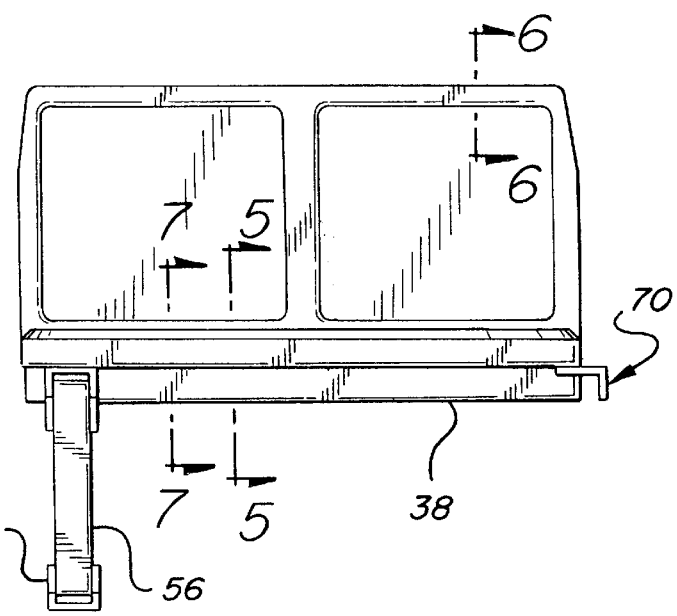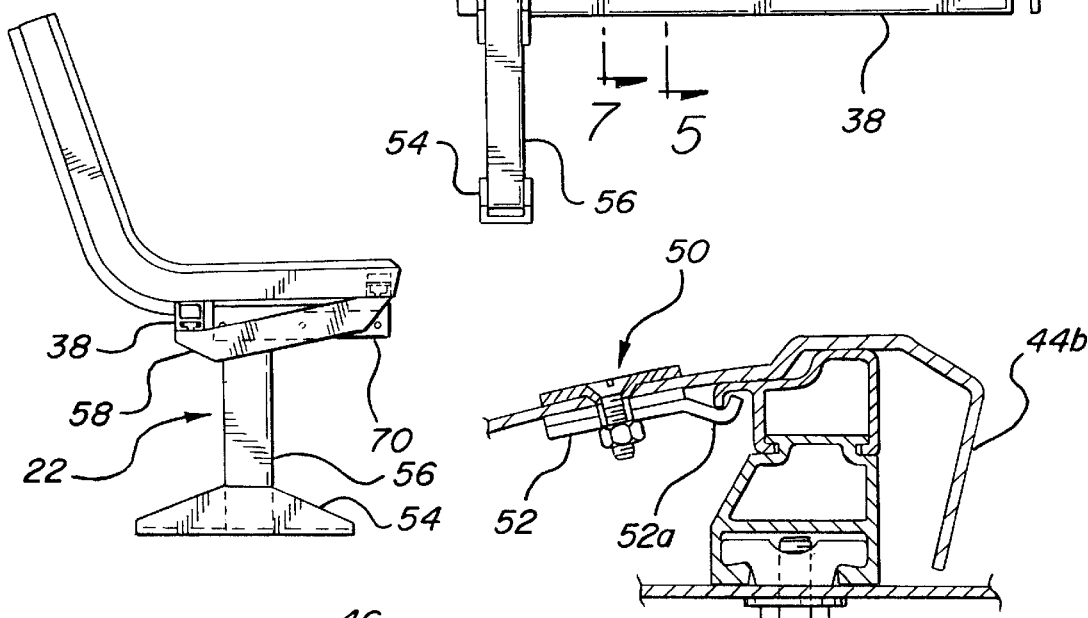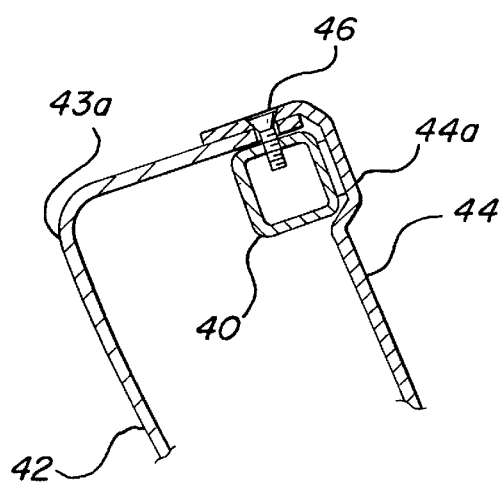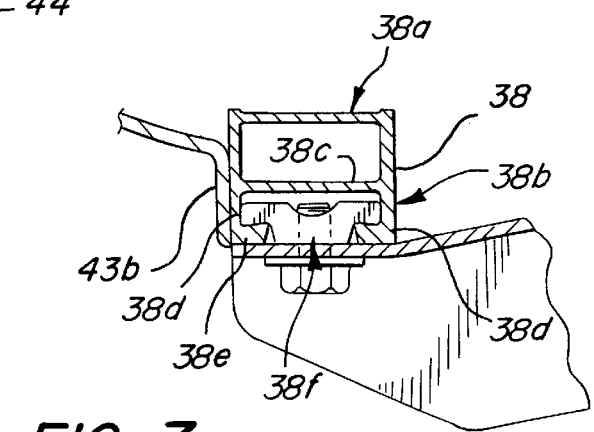

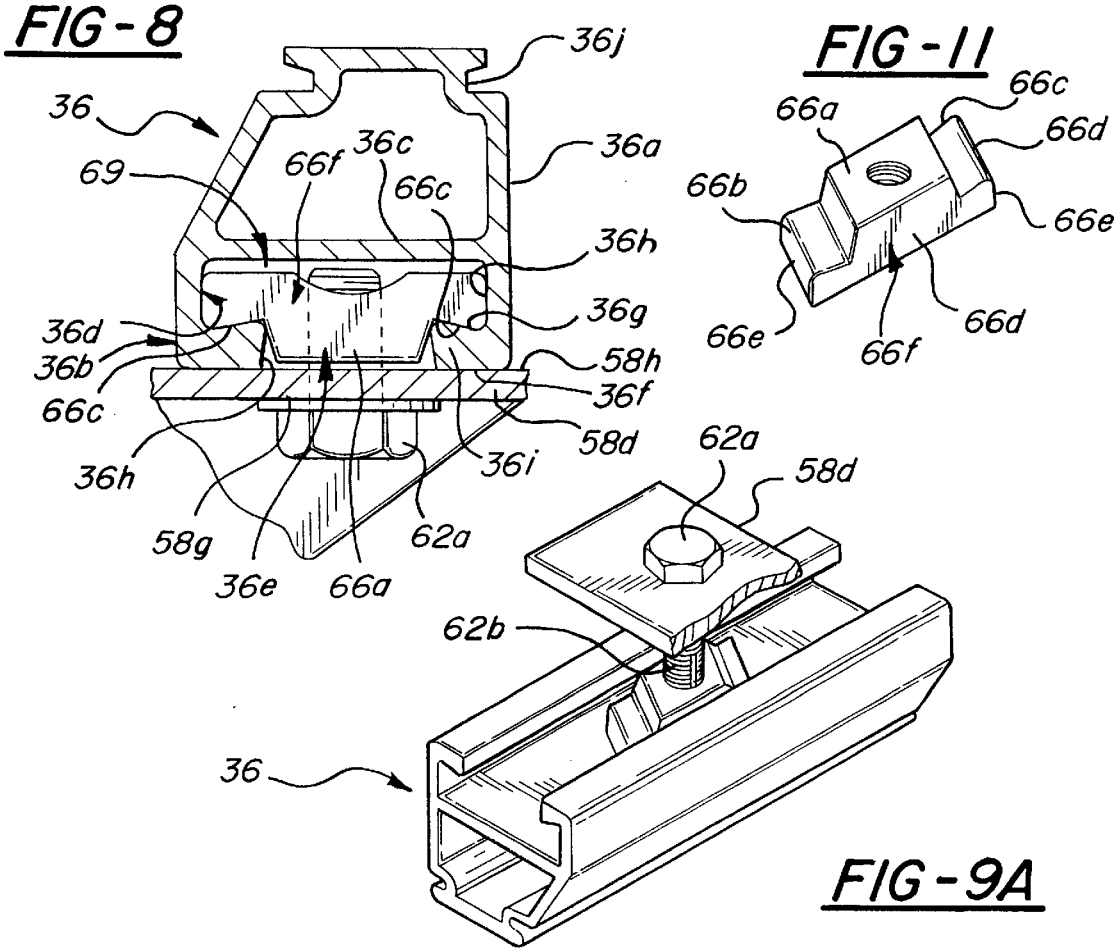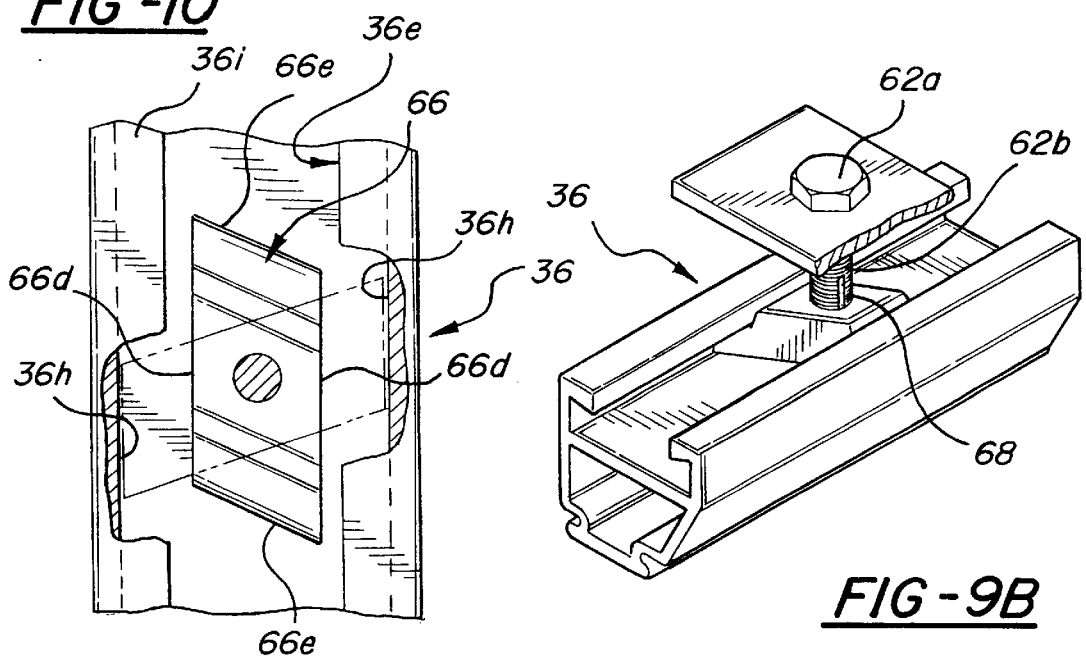

5,839,787

SEAT ASSEMBLY FOR MASS TRANSIT VEHICLE

This is a divisional of application Ser. No. 08/726,919 filed on Oct. 7, 1996, now U.S. Pat. No. 5,655,816 which is a continuation of Ser. No. 08/812,825 filed Sep. 24, 1994, now abandoned.

BACKGROUND TO THE INVENTION

This invention relates to seating assemblies and more particularly to seat assemblies especially suited for installation in mass transit vehicles.

Seat assemblies for mass transit vehicles present problems and requirements that are unique to the mass transit environment. Specifically, mass transit seats must be sturdy, durable, light weight, attractive, comfortable, inexpensive in construction and manufacture, and inexpensive in installation. Whereas a myriad of mass transit seat assembly constructions have been proposed and/or utilized, none of the prior art seat assemblies satisfy all of the above requirements and, specifically, each of the prior art seat assemblies achieves one or more of the listed requirements at the expense of one or more of the other listed requirements. Further, the prior art seat assemblies have generally been dedicated to a specific support bracketry and, accordingly, have been dedicated to installation in the vehicle in a specific position or attitude.

SUMMARY OF THE INVENTION

This invention is directed to the provision of an improved seat assembly for a mass transit vehicle.

More specifically, this invention is directed to the provision of a mass transit seat assembly which facilitates the installation of seating in a mass transit vehicle in a variety of positions and attitudes and at a minimum of cost.

The invention seat assembly is intended to facilitate the installation of seats in a mass transit vehicle and includes a plurality of seat frames; a plurality of support brackets of varying configurations; and a releasable fastener system operative to releasably fasten respective support brackets to respective frames at a variety of locations on the frames. With this arrangement, the frames may be installed in the transit vehicle in a variety of positions and attitudes by selective combinations of the frames and support brackets and selective utilization of the releasable fastener system to releasably secure respective support brackets to respective frames at varying locations on the frames.

According to a further feature of the invention, the releasable fastener system comprises a groove formed in each frame and a fastener assembly mounted on each support bracket and adjustably coacting with the groove of the respective frame. This specific releasable fastener system arrangement allows the ready and releasable securement of respective support brackets to respective frames at varying locations on the frames.

According to a further feature of the invention, each frame includes side rails and a cross rail extending between the side rails and each cross rail includes a track portion defining the groove for the respective frame. This specific construction provides a ready and convenient means or providing the groove of the releasable fastener system.

According to a further feature of the invention, each cross rail is formed as an extrusion. Forming the cross rail in an extrusion operation allows the ready and inexpensive formation of the grooves forming a part of the releasable fastener system.

According to a further feature of the invention, the extrusion is an aluminum extrusion. The use of aluminum as the extrusion material takes advantage of the superior extrusion behavior of aluminum and allows the ready formation of a groove of the required size and configuration.

According to a further feature of the invention, the side rails are also formed as aluminum extrusions. This arrangement allows the superior extrusion behavior of aluminum to be utilized in the formation of all of the members of the frame.

According to a further feature of the invention, each fastener assembly includes a nut sized to fit slidably and non-rotatably in the coacting groove and a bolt mounted on the support bracket and threadably engaging the nut. This specific arrangement provides a simple and effective means of allowing the support brackets to be secured to the respective frames at varying locations on the frames.

The support brackets take varying forms and configurations and may include, for example, a pedestal supported on the floor surface of the vehicle and releasably secured at its upper end to the seat frame; a cantilever beam assembly attached to a side wall of the vehicle and having a free end portion releasably secured to the seat frame; and a variety of other bracket configurations including in each case a bracket portion adapted for securement to a support surface defined by the vehicle and a further bracket portion adapted for releasable securement to the seat frame.

The invention also provides an improved methodology for installing transit seats in a variety of positions and attitudes in a transit vehicle. The invention methodology includes the steps of providing a plurality of seat frames; providing a plurality of support brackets of varying configurations; providing a releasable fastener system operative to releasably fasten respective support brackets to respective frames at a variety of locations on the frames; and installing the frames in the transit vehicle in a variety of positions and attitudes by selective combination of the frames and support brackets and selective utilization of the releasable fastener system to releasably secure respective support brackets to respective frames at varying locations on the frames. This methodology allows a standardized frame to be utilized with a variety of support brackets to provide a variety of seat positions and seat attitudes within the transit vehicle.

The invention also includes an improved method for forming a transit seat of the type including a frame having side rails and cross rails extending between the side rails. According to the invention methodology, the side rails are formed as tubular aluminum extrusions; the cross rails are formed as tubular aluminum extrusions with an external groove formed integrally with a side wall of at least a first and second cross rail; and the side rails and cross rails are welded together with the first cross rail constituting a front rail of the frame, the second cross rail constituting a rear rail of the frame, and the external grooves of the first and second cross rails opening outwardly. This methodology allows the ready and efficient formation of a universal seat frame providing a variety of mounting options in the transit vehicle.

DESCRIPTION OF THE DRAWINGS

FIG. 2 is an exploded perspective view of one of the seat assemblies seen in FIG. 1;

FIGS. 3 and 4 are side and front views respectively of the seat assemblies seen in FIG. 2;

FIGS. 5, 6 and 7 are cross-sectional views taken on lines 5—5, 6—6, and 7—7 of FIG. 3;

FIG. 8 is a detail cross-sectional view showing a releasable fastener system utilized in the invention seat assemblies;

FIGS. 9A, 9B, 10 and 11 are detail views showing further details of the releasable fastener system;

DETAILED DESCRIPTION OF THE PREFERRED EMBODIMENT

Figure 1:
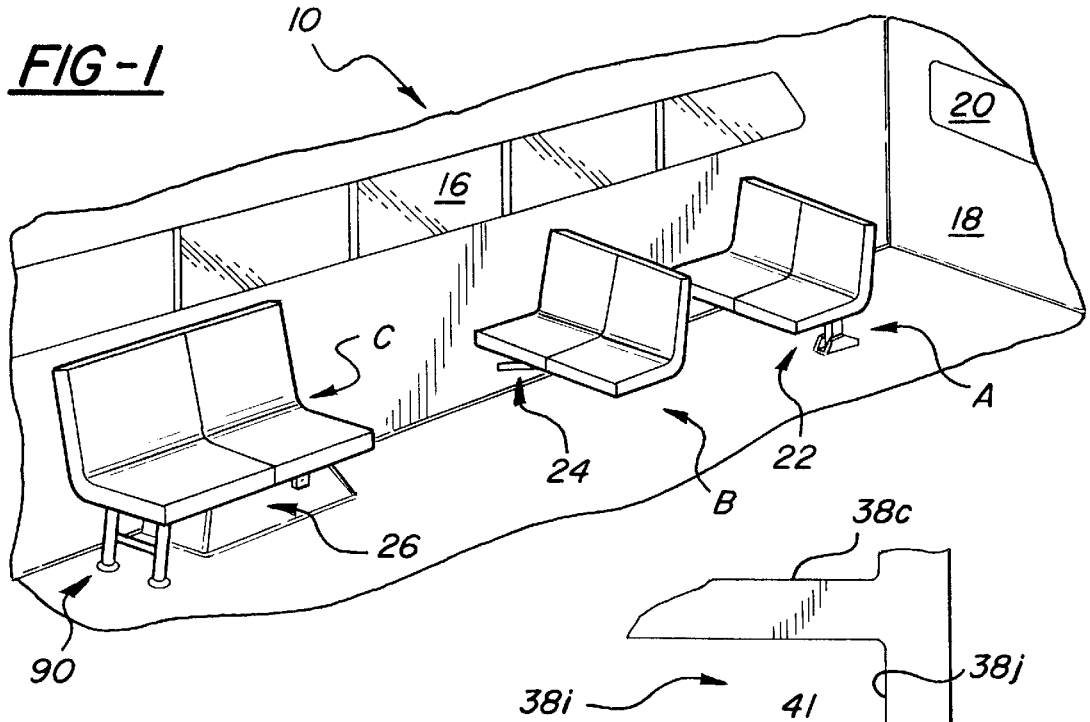
FIG. 1 is a fragmentary perspective view of a public transit vehicle interior showing various seat assemblies.

FIG. 1 illustrates a mass or public transit vehicle 10, such as a bus, including a floor 12, a sidewall 14 defining a side window 16, a rear wall 18, and a rear window 20. In accordance with the invention, a plurality of seat assemblies are provided in the vehicle, including a transverse seat assembly A supported by a pedestal assembly 22; a further transverse seat assembly B supported by a cantilever assembly 24; and a longitudinal seat assembly C supported in overlying relation to a wheel housing 26 of the vehicle.

All of the assemblies A, B, and C include a common seat frame 30.

Figure 14A:
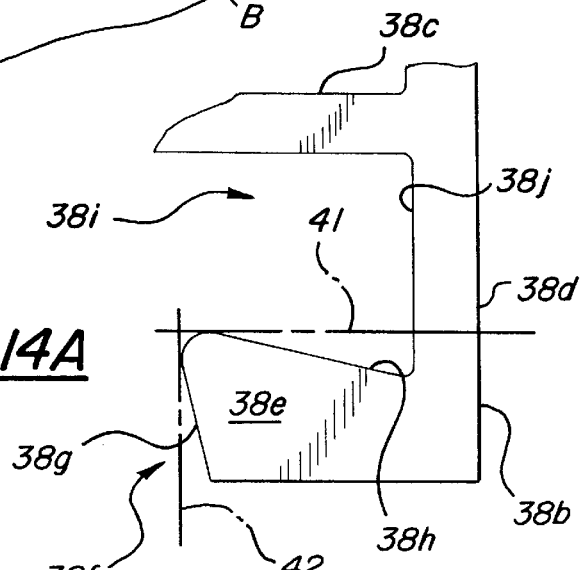
FIG. 14A is a detail view taken within the circle 14A of FIG. 14.
Figure 14:
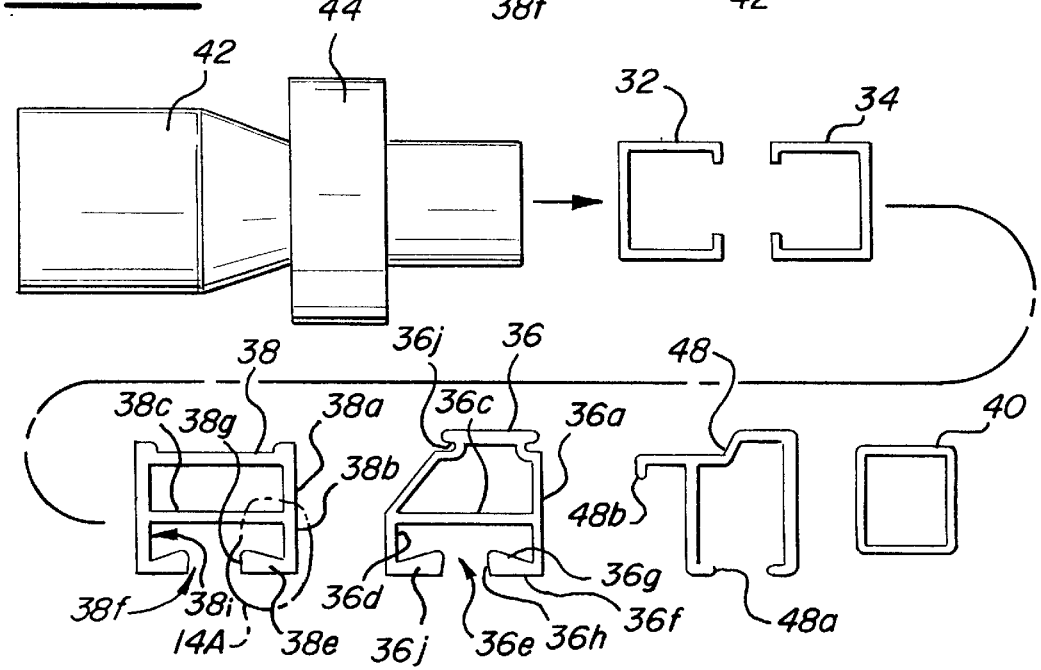
FIG. 14 is a schematic view showing the extrusion of various elements of the invention seat assemblies.

Seat frame 30 comprises a plurality of aluminum extrusions welded together to form the frame and, specifically, includes a right side rail 32 of L configuration, a left side rail 34 of L configuration, a front cross rail or stretcher 36, a rear cross rail or stretcher 38, and a top cross rail or stretcher 40. As illustrated in FIG. 14, each of the rails of the seat frame can be formed in known manner starting with an aluminum billet 42 which is passed through an extrusion die 44 of varying cross-sectional configuration to produce the various extrusions 32, 34, 36, 38, and 40.

In the welded, assembled configuration of the rails, top rail 40 is positioned in slots 32a, 34a in the tops of the side rails 32, 34; rear cross rail 38 is positioned against the lower face 32b, 34b of the lower or horizontal portion 32c, 34c of the side rails; and front cross rail 36 is positioned between the front ends 32d, 34d of the lower portions 32c, 34c of the side rails.

Top rail 40 has a generally rectangular tubular configuration.

Rear rail 38 includes an upper tube portion 38a of rectangular configuration and a lower track portion 38b formed integrally with the bottom wall 38c of the upper tube portion. Track portion 38b includes spaced side wall portions 38d and a pair of lower ridge portions 38e. Ridge portions 38e are spaced to define a slot 38f between the confronting vertical faces 38g of the ridge portions extending the length of the rail. The upper faces 38h of the ridge portions, the inner faces of the side wall portions 38d, and the lower face of bottom wall 38c coact to define a groove 38i extending the length of the rail. Groove 38i and slot 38f coact to define a T configuration in cross section. The upper faces 38h of the ridges are undercut with respect to a horizontal reference line 41 and the vertical faces 38g of the ridges are undercut with respect to a vertical reference line 42.

Front cross rail 36 includes an upper tube portion 36a of quadrilateral configuration and a lower track portion 36b formed integrally with the bottom wall 36c of the upper tube portion and defining a groove 36d and a slot 36e opening in the bottom wall 36f of the track portion and coacting with the groove to define a T configuration in cross section. The upper and vertical faces 36g, 36h of the spaced ridges 36i defining the slot 36e are undercut as described with reference to rail 38. It will be seen that, in the assembled configuration of the rails, grooves 36d and 38i open downwardly and are accessible from a location beneath the rails via the slots 36e, 38f.

Seat frame 30 is trimmed out utilizing a back panel 43 and a shell 44, both formed of a suitable synthetic material. Back panel 43 is secured at its upper end portion 43a by fasteners 46 to top rail 40 and is suitably secured at its lower end portion 43b to rear cross rail 38. The upper rear portion 44a of shell 44 is secured to top rail 40 utilizing fasteners 46 and the lower front portion 44b of shell 44 is secured to the seat frame utilizing a pair of shell supports 48 and retainer bracket assemblies 50, including retainer brackets 52. Shell supports 48 are preferably formed as aluminum extrusions (see FIG. 14) and include parallel spaced ridge portions 48a for snapping coaction with parallel spaced grooves 36j formed in the upper wall of tubular portion 36a of front cross rail 36 so that shell supports 48 may be mounted on the top of front cross rail 36 by pressing the cross rails downwardly with respect to the cross rail 36 to snappingly insert ridges 48a in grooves 36j. Each retainer bracket 52 of each retainer bracket assembly 50 includes a hook portion 52a for hooking coaction with a hook portion 48b of shell supports 48 to position the retainer bracket assemblies relative to the front cross rail and facilitate attachment of the shell to the cross rail.

As previously indicated, a seat assembly A is positioned transversely in vehicle 10 utilizing a pedestal assembly 22; a seat assembly B is positioned transversely in vehicle 10 utilizing a cantilever assembly 24; and a seat assembly C is positioned in vehicle 10 in overlying relation to the wheel housing 26 of the vehicle.

Figures 12, 13:
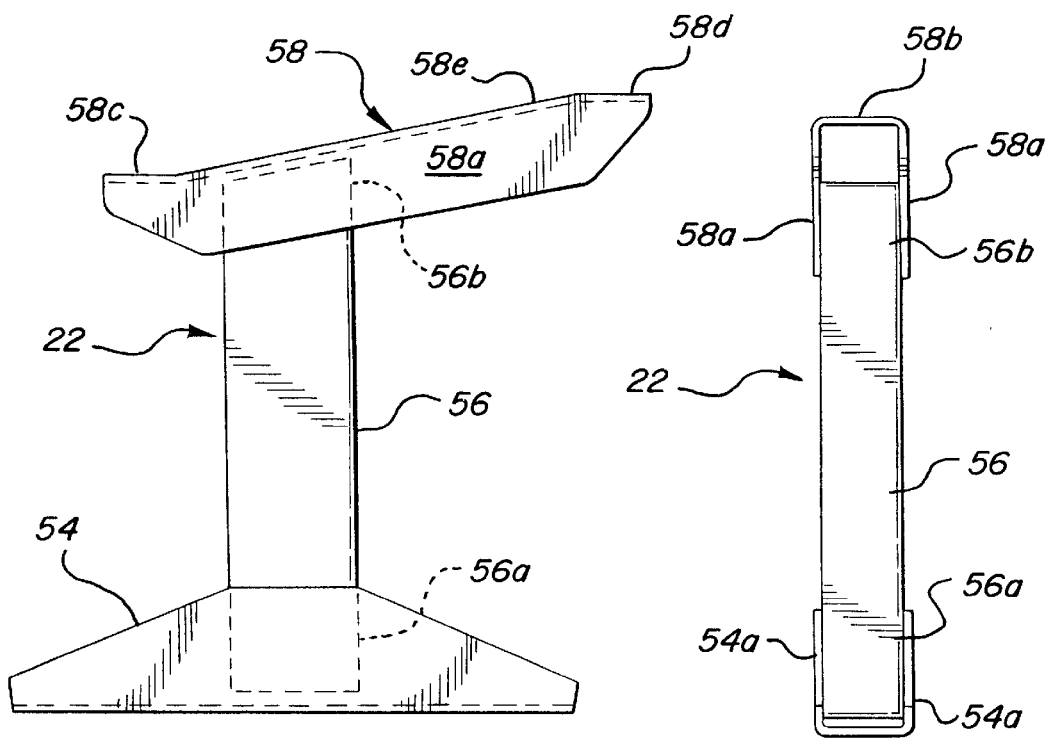
FIGS. 12 and 13 are detail views of a pedestal assembly utilized in the seat assembly of FIG. 2.
Figure 15:
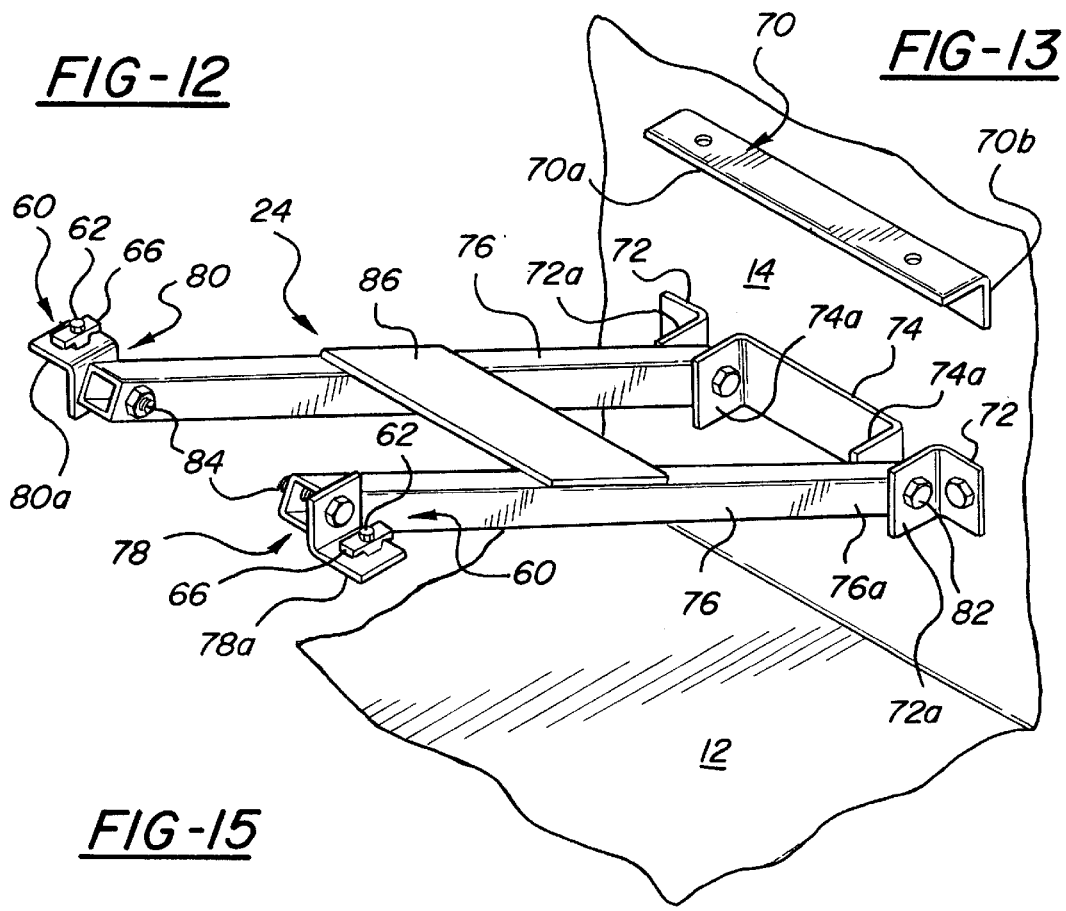
FIG. 15 is a perspective view of a cantilever assembly utilized in another of the seat assemblies of FIG. 1.
Figure 16:
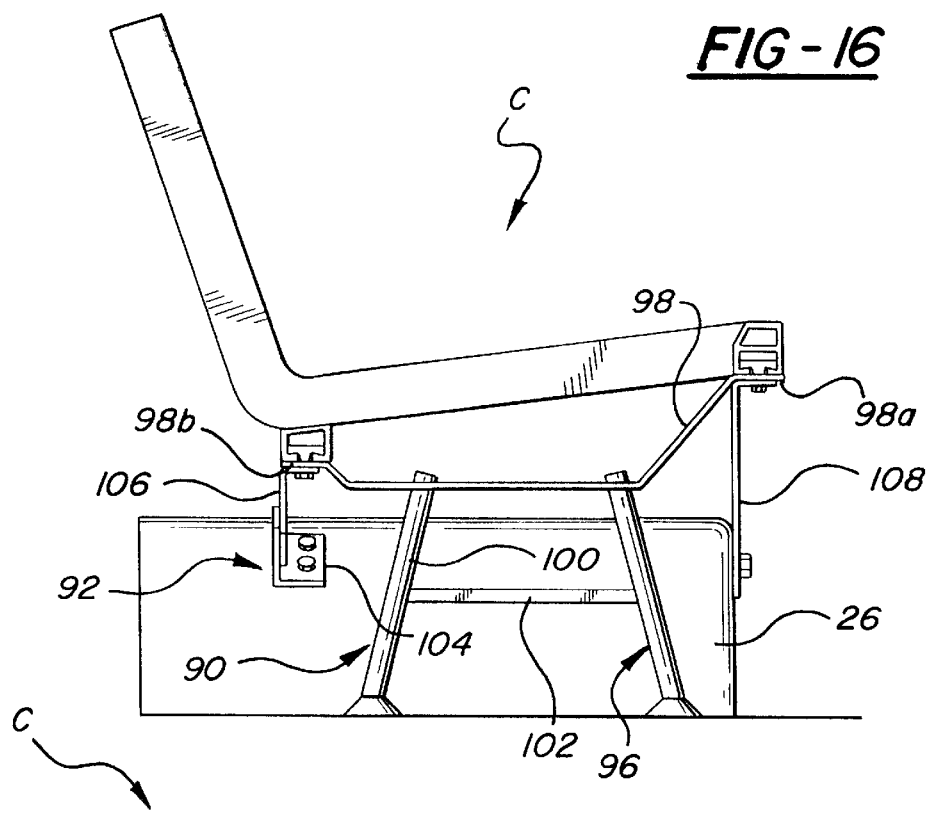
FIGS. 16 and 17 are end and front views respectively of a further seat assembly shown in FIG. 1.
Figure 17:
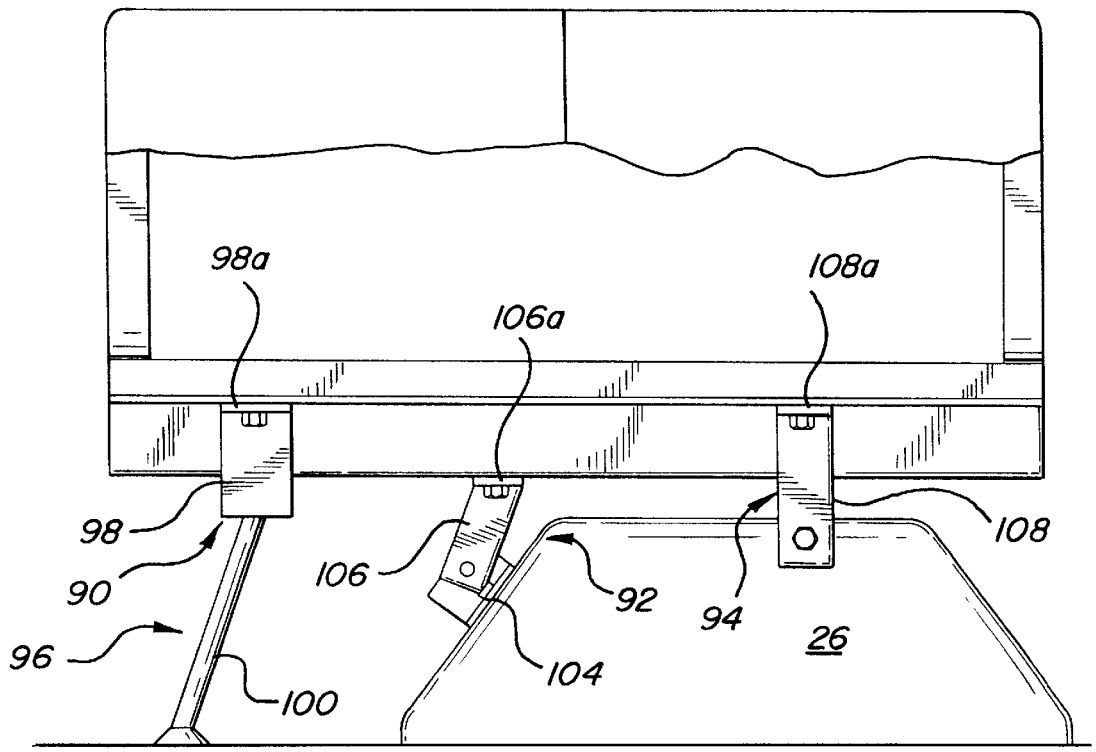

Pedestal assembly 22, as best seen in FIGS. 2, 12 and 13, includes a foot member 54, a post member 56, and a top member 58. Members 54, 56 and 58 can be formed of aluminum or any other suitable rigid material. Foot member 54 has an upwardly opening U shaped cross-sectional configuration, top member 58 has a downwardly opening U shaped cross-sectional configuration, and post 56 has a tubular rectangular cross-sectional configuration. Members 54, 56 and 58 are welded together with the lower end 56a of post 56 positioned between the sidewalls 54a of foot member 54 and with the upper portion 56b of the post positioned between the sidewalls 58a of the top member. The top wall 58b of the top member 58 has a compound configuration including a flat rear mounting portion 58c, a flat front mounting portion 58d, and an upwardly angled central portion 58e interconnecting the front and rear mounting portions.

Pedestal assembly 22 is adjustably secured to a seat frame 30 to form the transverse seat assembly A utilizing a pair of fastener assemblies 60. Each fastener assembly 60 includes a bolt 62, a washer 64, and a nut 66.

Bolt 62 includes a hex head portion 62a and a threaded shaft portion 62b, including a nylon patch 68.

Nut 66 has a T configuration in cross section (corresponding generally to the T configuration of the slot and groove defined by the track portions of the rails 36 and 38), and a parallelogram configuration in top or plan view. Nut 66 includes a main body central portion 66a and side or wing portions 66b which are undercut at 66c to match the undercut of the upper ridge surfaces 36g, 38h of the rails 36, 38. The right angle distance between the side faces 66d of the nut is slightly less that the width of the slots 36e, 38f defined by the track portions of the cross rails 36i–36i and the right angle distance between the ends 66e of the nut corresponds generally to the distance between the parallel surfaces 36g–36g and 38j–38j defining the spaced parallel sides of the slots 36e, 38f.

Preparatory to mounting the seat assembly A in the vehicle, fastener assemblies 60 are positioned on the opposite ends of the top member 58 of the pedestal assembly 22 with the shanks of the bolts 62 passing upwardly through slots 58f in the mounting portions 58c, 58d and engaging a respective nut 66 with a washer 64 positioned therebetween. To mount the seat assembly in the vehicle, the seat frame 30 is positioned against vehicle side wall 14; the pedestal assembly 22 is positioned beneath the seat frame proximate the outboard edge of the seat frame; the nuts 66 of the fastener assemblies are passed upwardly through the slots 36e, 38f of the front and rear cross rails to position the nuts in the grooves 36d, 38i (FIG. 9A); the bolt heads are turned to turn the nuts (via the nylon patches 68) through slightly less than one-quarter turn to bring the respective end edges 66e of the nuts into abutting relation with the side walls 36i, 38j of the grooves 36d, 38i; the pedestal assembly is moved transversely to the desired final position relative to the seat frame; the foot member of the pedestal assembly is suitably secured to the vehicle floor; and the bolts 62 are moved in a tightening direction to bring the bolt heads up against the underface 58g of the bracket mounting portions and move the upper face 58h of the mounting portion into confronting clamping relation with the lower face of the track portion of the respective cross rail.

Note that, as best seen in FIG. 8, in the final clamped configuration of each fastener assembly relative to the respective cross rail, the T cross-sectional configuration of the nut is positioned slidably within the T cross-sectional configuration defined by the groove and slot of the track portion with the undercut of the grooves coacting with the undercut of the wing portions of the nut to firmly and positively position the nut within the groove of the track portion. Note further that the effective thickness of the nut is less than the effective height of the groove so that there is a space or clearance 69 above the nut between the top of the nut and the top of the groove into which the upper end of the bolt shaft projects. This clearance allows the upper end of the shaft of the bolt to project above the top of the nut by varying distances while allowing the head of the bolt to seat firmly against the underfaces of the bracket mounting portion and allowing the upper face of the bracket mounting portion to seat firmly against the lower face of the track portion of the cross rail. The upper end of the nut is also preferably scalloped at 66g.

The mounting of the seat assembly in the vehicle is completed by the use of a wall bracket 70 of angle configuration including a horizontal leg portion 70a suitably bolted to the lower face 32b of the right side rail 32 and a vertical leg portion 70d suitably bolted to the side wall 14 of the vehicle.

Seat assembly B is mounted in a transverse position in the vehicle utilizing cantilever assembly 24 and fastener assemblies 60.

Cantilever assembly 24, as best seen in FIG. 10, includes a plurality of wall brackets 72, 74; a pair of tubular beam members 76; and a pair of angle brackets 78, 80. Beam members 76 are mounted at one end 76a thereof between flange portions 72a, 74a of the wall brackets by bolt assemblies 82. Angle brackets 78 and 80 are pivotally secured to the free ends of the respective beam members 76 via bolt assemblies 84 and the beam members are rigidly interconnected intermediate their ends by a cross plate 86. Angle brackets 78, 80 are inverted with respect to each other so that the horizontal flange portion 78a of bracket 78 is disposed downwardly and the horizontal flange portion 80a of bracket 80 is disposed upwardly. A bolt assembly 60 is mounted on the horizontal leg portion 78a of angle bracket 78 and a bolt assembly 60 is mounted on the horizontal leg portion 80a of angle bracket 80.

To mount the seat assembly B in the vehicle in the illustrated transverse position, brackets 72, 74 are suitably secured to vehicle wall surface 14; the seat frame is positioned over the cantilever assembly; the cantilever assembly is adjusted to move the nuts 66 of the nut assemblies upwardly through the slots in the front and rear cross rails to position the nuts in the grooves defined in the front and rear cross rails; the bolts are turned to move the nuts through slightly less than one-quarter turn to bring the ends 66e of the nuts into abutting engagement with the parallel side walls of the respective grooves; and the bolts are further tightened to bring the heads of the bolts into engagement with the underfaces of the leg portions 78a, 80a of the angle brackets and to bring the lower faces of the track portions of the cross rails into clamping abutting engagement with the upper faces of the leg portions 78a, 80a of the angle brackets, whereby to fixedly clamp the free end of the cantilever assembly to the seat assembly. Installation of the seat assembly B is completed by utilizing a wall bracket 70 including a horizontal flange portion 70a secured to the underface of the right side rail of the seat frame and a vertical flange portion secured to the vehicle wall 14 in overlying relation to the wall brackets 72, 74.

Seat assembly C is mounted in a longitudinal position in the vehicle in overlying relation to wheel housing 26 utilizing bracket assemblies 90, 92 and 94 and fastener assemblies 60.

Bracket assembly 90 includes a leg structure 96 and a flat bar member 98. Leg structure 96 includes a pair of legs 100 joined by a cross rail 102. Bar member 98 is secured to the upper ends of the legs 100 and defines a front mounting portion 98a and a rear mounting portion 98b. A fastener assembly 60 is mounted on the front mounting portion 98a of bar member 98 and a further fastener assembly 60 is mounted on the rear mounting portion 98b of the bar member.

Bracket assembly 92 includes an angle mounting bracket 104 fixedly secured to wheel housing 26 and a brace bar 106 defining a mounting portion 106a. A fastener assembly 60 is mounted on the mounting portion 106a.

Bracket assembly 94 includes a brace bar 108 fixedly secured at its lower end to wheel housing 26 and defining a mounting portion 108a at its upper end. A fastener assembly 60 is mounted on the mounting portion 108a.

To mount the seat assembly C in the vehicle, the seat frame is positioned in overlying relation to the wheel housing, mounting angle bracket 104 of bracket assembly 92 is fixedly secured to the wheel housing; bar strap 108 of bracket assembly 94 is fixedly secured to the wheel housing; bracket assembly 90 is positioned beneath the end of the seat assembly projecting forwardly of the wheel housing; the nut of the fastener assembly mounted on the portion 108a of bar 108 is passed upwardly through the slot in the front cross rail; the nut of the fastener assembly mounted on the mounting portion 106a of the brace plate 106 is passed upwardly through the slot in the rear cross rail; the nuts of the fastener assemblies mounted on the front and rear portions 98a, 98b of the bar member 98 are passed upwardly through the slots in the front and rear cross ails respectively; the nuts are slid along the respective slots to the precise desired position of adjustment; the respective bolts 62 are turned to bring the respective nuts into engagement with the opposite side walls of the grooves of the respective cross rails; and the respective bolts are further turned in a tightening direction to bring the heads of the bolts into abutment with the under surface of the respective bracket mounting portion and bring the undersurface of the track portion of the respective rail into clamping engagement with the upper face of the respective mounting portion, whereby to fixedly secure the seat to the vehicle in overlying relation to the wheel housing.

The invention will be seen to provide many important advantages. Specifically, the invention provides a universal seat frame for use with a variety of support hardware to allow the installation of the universal frame in a variety of positions and attitudes within the vehicle. More specifically, the use of aluminum extrusions to form the members of the seat frame allows the ready and inexpensive formation of the shapes and configurations necessary to impart the universal characteristics to the seat frame. The use of aluminum extrusions further results in a lighter seat assembly with consequent improvement in the fuel economy of the associated vehicle and consequent reduction in the required structural strength of the associated vehicle. The use of a standard universal seat frame further simplifies inventory requirements for vehicle manufacturers since only a single seat frame need be kept in inventory for all normal seat installations.

Whereas a preferred embodiment of the invention has been illustrated and described in detail, it will be apparent that various changes may be made in the disclosed embodiment without departing from the scope or spirit of the invention. For example, although the invention has been described as providing versatility and variability with respect to mounting the seat in the transit vehicle, it must be remembered that, in any mounting situation, accepted mounting criteria must be complied with to provide necessary and accepted strength and durability for the mounting structure.

We claim:

1. A seating assembly for installing in a transit vehicle comprising:

a seat frame including spaced side rails each having a front end, a front cross rail extending between the front ends of the side rails and immovably secured to the front ends, and a rear cross rail extending between the side rails rearwardly of the front cross rail, each cross rail having a channel structure defining a transversely extending groove and a transversely extending slot in a lower wall of the channel structure beneath the groove providing access to the groove;

a support bracket having an upper end defining spaced front and rear apertures; and front and rear fastener assemblies mounted at spaced front and rear locations on the upper end portion of the support bracket in association with the front and rear apertures and each including a nut having a configuration which slidably fits in the groove of a respective cross rail, and a bolt having a head and a threaded shank extending upwardly through a respective aperture in the upper end portion of the support bracket and through the slot in the lower wall of the respective channel structure for threaded connection with the respective nut, the fastener assemblies being operative in response to loosening of the threaded connections between the nuts and bolts to allow transverse adjustment of the support member relative to the cross rails and operative in response to tightening of the threaded connections to clamp the support bracket to the cross rails in any position of relative transverse adjustment along the grooves, each groove and slot coacting to define a T configuration, each nut having a T configuration in transverse cross section matching the T configuration of the respective groove and slot and including a head portion positioned slidably in the respective groove and a shank portion positioned slidably in the respective slot, each nut having an oblong configuration in plan view including a minor dimension, sized to pass through the respective slot with the nut secured to the threaded shank of the bolt in a first angular orientation, and a major dimension, sized to enable end edges of the head portion of the nut to engage side walls of the respective groove, each fastener assembly further including friction means interposed between the nut and the threaded shank of the bolt operative to cause the nut to turn with the bolt in the absence of resistance to nut rotation, whereby, after the nut has been passed upwardly on the threaded shank of the bolt through the slot, the bolt may be rotated to rotate the nut to a second angular orientation in which the end edges engage the side walls of the groove.

2. A seating assembly according to claim 1 wherein each cross rail is formed as an extrusion.

3. A seating assembly according to claim 2 wherein the extrusion is an aluminum extrusion.

4. A seating assembly according to claim 3 wherein the side rails are also formed as aluminum extrusions.

* * * * *